May 24, 1960 J. B. CHATTEN 2,938,169

APPARATUS FOR IMPROVING REPRODUCED COLOR TELEVISION IMAGES

Filed Oct. 28, 1955

4 Sheets-Sheet 1

INVENTOR.
JOHN B. CHATTEN
BY
[signature]
ATTORNEY

May 24, 1960 J. B. CHATTEN 2,938,169

APPARATUS FOR IMPROVING REPRODUCED COLOR TELEVISION IMAGES

Filed Oct. 28, 1955 4 Sheets-Sheet 2

INVENTOR.
JOHN B. CHATTEN

BY

ATTORNEY

May 24, 1960 J. B. CHATTEN 2,938,169

APPARATUS FOR IMPROVING REPRODUCED COLOR TELEVISION IMAGES

Filed Oct. 28, 1955 4 Sheets-Sheet 3

INVENTOR.
JOHN B. CHATTEN
BY
[signature]
ATTORNEY

APPARATUS FOR IMPROVING REPRODUCED COLOR TELEVISION IMAGES

Filed Oct. 28, 1955

INVENTOR.
JOHN B. CHATTEN
BY
ATTORNEY

United States Patent Office 2,938,169
Patented May 24, 1960

2,938,169

APPARATUS FOR IMPROVING REPRODUCED COLOR TELEVISION IMAGES

John B. Chatten, Philadelphia, Pa., assignor to Philco Corporation, Philadelphia, Pa., a corporation of Pennsylvania Filed Oct. 28, 1955, Ser. No. 543,338

20 Claims. (Cl. 328—169)

This invention relates to systems for modifying signals and in particular to systems for improving the reproduction of lowlights in scenes which are televised in color.

It is characteristic of most display tubes used to reproduce images of scenes televised in color that the quality of reproduced images is adversely affected by the ambient light normally present in the room in which the tube is used. With these display tubes the adverse effects of the ambient light result in poor reproduction of the colors of the scene televised. The ambient light desaturates the colors produced by the color display tube so that the pure red areas of the images, for example, tend to become pinkish, and pure blues and greens become corresponding pastel shades. It affects the reproduction of all colors, but its degrading effect on the image is most marked in the low brightness areas or "lowlights" of the image. Since it is difficult and sometimes impossible to control the ambient light in the room in which the images are viewed, it is desirable to increase the brightness of selected lowlights so that the effects of ambient light are not as great thereupon. It would therefore be advantageous to modify at the transmitter, the signals which are ultimately received so that the intensity of the components thereof which correspond to the selected lowlights is increased.

There is another factor which enters into the quality of the reproduced image, namely halation. Halation causes the reproduced image to suffer by way of desaturation of the colors reproduced thereupon. Halation occurs because, as phosphors emissive of different colors within the display tube are caused to emit light, the light of the red phosphor, for example, is reflected by the internal surfaces of the glass faceplate of the tube back toward phosphors emissive of other colored light so that the colors tend to merge. The effects of halation, like those of ambient light, are especially noticeable in the lowlights of the image. Modifying the components of the transmitted signals which correspond to the lowlights would increase the brightness of the lowlights of the reproduced image so that the effects of halation are minimized.

While the effects of ambient light and halation cause common degrading effects in images produced by most color television reproducing tubes, there are some other visual phenomena which are peculiar to certain types of color television reproducing tubes which also can be counteracted by modifying the transmitted signals so that the intensity of selected lowlight representative components thereof is increased. One of these phenomena is present in multi-gun colored image reproducing tubes of the so-called "aperture mask" or allied types, for example. The "aperture mask" tube consists of a screen containing a plurality of phosphors emissive of light in selected colors, a plurality of electron guns whose respective intensities are modulated to correspond to the intensities of the colors of the elements in the scene televised, and a perforated mask interposed between the electron beams and the phosphors on the screen in order to assist in assuring that the respective beams impinge only on corresponding sets of phosphors.

In order to produce grays and whites in the image produced by the aperture mask tube which are not tinted by any other color, this tube and its associated circuitry are usually adjusted so that the light outputs from the various phosphors are in the correct ratios. When so adjusted, scenes televised in color and in black-and-white will be correctly reproduced. The aforesaid ratios of light output from the three phosphors which are correct for the production of white or gray tones are relatively easy to obtain at any one light level by adjusting the beam currents of the respective electron guns to produce a neutral gray. It is more difficult to obtain the correct ratios dynamically at varying light levels such as occur when brighter or darker elements of the scene are being scanned since the beam currents of the respective electron guns must increase or decrease in a balanced manner. Perfectly balanced electron gun performance is impossible to achieve, in practice, because the transfer characteristics of the three guns are generally not identical, the same change in voltage producing different changes in current from each gun. It is further complicated by the fact that the efficiencies of the phosphors are different, requiring greater beam current for the red gun, for example, than for the other guns. The driving voltages applied to the respective electron guns are therefore different, being inversely proportional to the efficiencies of the respective phosphors which are to be impinged thereby.

Ideally, the display tube should be able to produce all shades from black to a peak white. In practice, however, it is very difficult for such tubes to produce whites or grays which are untinted over the entire range from black to peak white because of the aforementioned transfer characteristics of the three electron guns. Therefore perfect white balance at lower levels of amplitude of the tube input signals is purposely sacrificed in order to maximize the white balance at higher signal input levels. The adjustment of the display tube and its associated circuitry is made in this fashion for various reasons. First, elements having medium or high brightness levels are more common in televised scenes than elements of low brightness. Second, the most important elements of the scenes usually are at medium or high brightness levels. Third, color errors in high and medium brightness areas would be much more noticeable than in low brightness areas. Such adjustment invariably results in poorer color fidelity in the reproduction of lowlights because the transfer characteristics for the three guns in this region are very unbalanced. For example, if the face of a person is first televised as it appears under a bright source of illumination, flesh color will be reproduced accurately, but if the person moves into a poorly illuminated spot, his face may appear as being tinged with green. Color fidelity in the lowlights produced by this type of tube may also be achieved by increasing the brightness of these areas in the reproduced image in accordance with my invention.

There is also another phenomenon which arises in display tubes of the type described in the co-pending application of W. E. Bradley, Serial No. 250,932 filed October 11, 1951, which, like ambient light and halation, also tends to desaturate the colors of the reproduced image. In this type of tube a number of discrete phosphor strips emissive of selected colors in response to electrons impingent thereupon are arrayed within the tube in a direction transverse to the scanning direction of a first electron beam whose intensity is varied to correspond to the color of the elements of the scene televised. In such a tube there is generally a second "indexing" beam which is deflected in unison with the first beam and which falls upon indexing elements disposed in a predetermined relation to selected ones of the phosphor strips. The indexing elements are characterized by a response to electron impingement which differs from the response of the phosphor strips and the other parts of the beam intercepting structure. As the second beam traverses the indexing elements signals are generated which are used to coordinate the position of the first beam with the modulation in intensity thereof so that proper color rendition will be effected.

Desaturation in this tube results from the fact that, while the current in the indexing beam is purposely kept low with respect to the current in the first beam the indexing beam nevertheless also impinges on all phosphor strips during the scanning of each raster with equal intensity so that a whitish or yellowish cast suffuses the picture. This type of desaturation also is more noticeable in the lowlights, so that if the brightness of the lowlights in the reproduced images is increased, the image as a whole would be improved.

In order to improve the quality of the reproduced image, the brightness of the lowlights reproduced on most color television display tubes may be increased by increasing, at the transmitter, the amplitude of the transmitted signals which correspond to low brightness areas of the scene televised. When the scene being televised is relatively static, such as when a color slide is being scanned, an engineer can analyze the deficiencies in the reproduction of the lowlights by observing a color picture monitor. If improvement in the reproduction of the lowlights is warranted, a method known as "exalted gamma correction" is sometimes employed. At all television transmitters, be they for the transmission of black and white or color television signals, the image representative voltage waves produced by the camera tube are applied to non-linear amplifiers known as "gamma correctors." The gamma correctors predistort the amplitude of the image representative signals by amplifying them so that the low intensity values of the signals are amplified more than the higher intensity values thereof to compensate for the complementary non-linear transfer characteristics of most television image display tubes.

Standards adopted by the F.C.C. for color television broadcast transmission specify that the color representative voltage waves shall be subjected to gamma correction. This is accomplished, at a color television transmitter, by applying the color representative voltage waves generated by the camera or other pick-up device to three gamma correctors whose transfer characteristic curves are matched. Since these gamma correctors are available at the transmitter, they are a convenient means for increasing the amplitude of the lowlight representative components of the color representative voltage waves. All that need be done is to make the slope of the normal matched transfer characteristic curves of the respective gamma correctors steeper for values of signal input which correspond to the lowlights of the televised scene. Thus, if the lowlights are being reproduced poorly, an engineer changes the transfer characteristics of all three gamma correctors so that they are equally matched in their performance.

Exalted gamma correction does tend to increase the brightness of the lowlights, but has some important disadvantages. The first disadvantage of exalted gamma correction may be explained simply by using an example in which it is assumed that exalted gamma correction is to be used to increase the brightness of the desaturated red lowlights of the reproduced image. Electrically, a signal corresponding to desaturated red may be composed for example of 5 parts of the red color representative voltage wave, 2 parts of the green representative voltage wave and 2 parts of the blue representative voltage wave. Each of these color representative voltage waves is applied to a corresponding one of three matched gamma correctors whose transfer characteristics have been altered in accordance with the principles of exalted gamma correction. Since the respective amplitudes of the green and blue representative voltage waves are relatively low, these waves will be amplified on the respective transfer characteristic curves of the corresponding gamma correctors over parts thereof whose slope is very steep. Since the relative amplitude of the red representative voltage wave is high, it is amplified over parts of the characteristic curve of the red representative signal gamma corrector whose slope is much less steep. Consequently the combined output of the three gamma correctors corresponding to desaturated red lowlights in the televised scene will now include different proportions of the color representative voltage waves, i.e., the green and blue representative voltage waves are proportionately much greater than before. With an increase in the proportions of the green and blue representative voltage waves, the red lowlights become even more desaturated, despite the increase in their brightness, with an attendant loss in color fidelity.

The second disadvantage of exalted gamma correction is that the engineer cannot change the brightness only of certain colored lowlights in the reproduced image without seriously affecting the reproduction of the gray scale. In the United States the standard luminance signal is composed of predetermined amounts of the gamma corrected color representative voltage waves. For the production of untinted shades of gray and white the proportions of red, green and blue should be constant at all intensities of white. Thus if only the red and blue lowlight representative signals are amplified in accordance with a value of gamma different from that of the green representative signals, a non-standard luminance signal would be produced resulting in certain distortions in color reproduction.

It is, accordingly, an object of the invention to provide systems for selectively modifying certain intensity levels of composite signals.

Another aim of the invention is to provide systems for selectively modifying the lower intensity levels of the composite image representative signals transmitted for reception by color television receivers.

Another object of the invention is to provide systems for improving the color fidelity of lowlights in images reproduced by multi-gun color television display tubes without affecting appreciably the brightness levels of other elements of the image.

A further object of the invention is to provide systems for improving the reproduction of colors of relatively low intensity in images produced by certain color television display tubes without affecting the saturation of those colors.

Another object of the invention is to provide systems for improving the reproduction of colors of relatively low intensity in images produced by color television display tubes without affecting the reproduction of black portions of the scene televised.

These objects, as well as others which will appear, are achieved according to my invention, by apparatus for amplifying input signals to be modified (such as image-representative composite color television signals which contain both luminance and chrominance components), whose gain varies as a function of the instantaneous amplitude of the input signals. In particular the lowlight-representative portions thereof are amplified more than the portions which represent medium and high brightness. This is accomplished by first combining the input composite color signals with a modulating signal having a relatively large amplitude with respect to that of the input signals. The modulating signal invariably has frequency components in the same band as those of the input signals, but the modulating signal components are eventually eliminated as will be demonstrated hereinafter. The combined waves are then applied to a non-linear amplifier. Since the amplitude of the composite color signal component is very small with respect to that of the modulating signal on which it rides, the color signal component is amplified on a portion of the non-linear transfer characteristic curve which is so small that its slope is practically linear so that both the luminance and chrominance components are amplified by approximately the same factor. Thus there is no alteration in the saturation of the colors corresponding to the parts of the composite color signal which have been modified.

In one form the apparatus includes means for combining the input signals with reference amplitude signals and with a unidirectional modulating signal having a large amplitude relative to the amplitude of the input signals. The modulating signal may be simply the luminance component of the input signal, or may be derived by combining desired amounts of the independently varying color representative voltage waves produced by the color television pick-up device. If the modulating signal consists of the standard luminance signal, it will have a large amplitude when the composite signal corresponds to highlights of the scene televised, and a small amplitude when it corresponds to the lowlights thereof. The reference signals have uniform amplitude values with maxima in the same direction as the maxima of the modulating signal. The combined input, reference and modulating signals are applied to a first non-linear amplifier. Since the modulating signal component of the applied signals is substantially larger than the component of the input signals it may be seen that it is the modulating signal component thereof which predominantly determines on which portion of its transfer characteristic curve the non-linear amplifier operates in amplifying the composite color signals component of the applied signals coincident therewith. Thus, in the case of color television signals, when the modulating signal component of the applied signals corresponds to lowlights, and consequently has a small amplitude, the components of the applied signals corresponding to the input signals coincident therewith are amplified much more than when the modulating signal corresponds to highlights. Preferably the parameters of the non-linear amplifier are such that the maximum amplitude portions of the applied signals are amplified at unity gain so that the brightness of the highlights is not modified. However, it should be understood that the brightness of portions of the input signals other than those corresponding to lowlights may also be modified to the extent desired by using the apparatus herein disclosed.

The modulating and reference signals are also combined and applied to a second non-linear amplifier having operating characteristics substantially identical to the first non-linear amplifier. The output wave of the second amplifier is applied to a polarity inverter and thence to a combining circuit to which the output wave of the first non-linear amplifier is also applied. In the combining circuit, the output wave of the second amplifier is subtracted from that of the first, thereby cancelling the modulating signal and the reference signal components thereof, leaving only the components thereof which correspond to the input signals, the lower amplitude portions of which have been amplified more than the higher amplitude portions thereof.

In another form of the invention, the input signals to be modified are first applied to a phase splitter whose two oppositely polarized output signal waves are then respectively combined with the modulating signal with reference signals inserted therein. The combined waves are applied in like fashion to two non-linear amplifiers with approximately identical operating characteristics in the same fashion as in the first form of the invention. The output wave of one of the amplifiers is then subtracted from the output wave of the other amplifier leaving only the components corresponding to the input signals whose lower amplitude ranges have been amplified more than the other amplitude ranges thereof. This form of the invention may require more circuits than the first form, but it possesses some advantages in helping to prevent unwanted distortion from being introduced into the modified input signals.

In still another form of the invention the input signals are first used to modulate an oscillatory wave having a frequency remote from the frequency range of the input signals themselves. The modulated oscillatory wave is added to the modulating signal containing the reference signals. The combined signals are then applied to a non-linear amplifier such that maximum amplitude values of the applied wave are amplified on the unity gain part of the curve or thereabouts, whereas the lower amplitude ranges of the applied signals are amplified by a larger factor. The components of the amplified signals corresponding to the input signals, which appear as modulations of the oscillatory wave, are then extracted from the output wave of the non-linear amplifying means by an appropriate filter. The modulation of the oscillatory wave is then detected to obtain the appropriately modified input signals.

Figure 1:
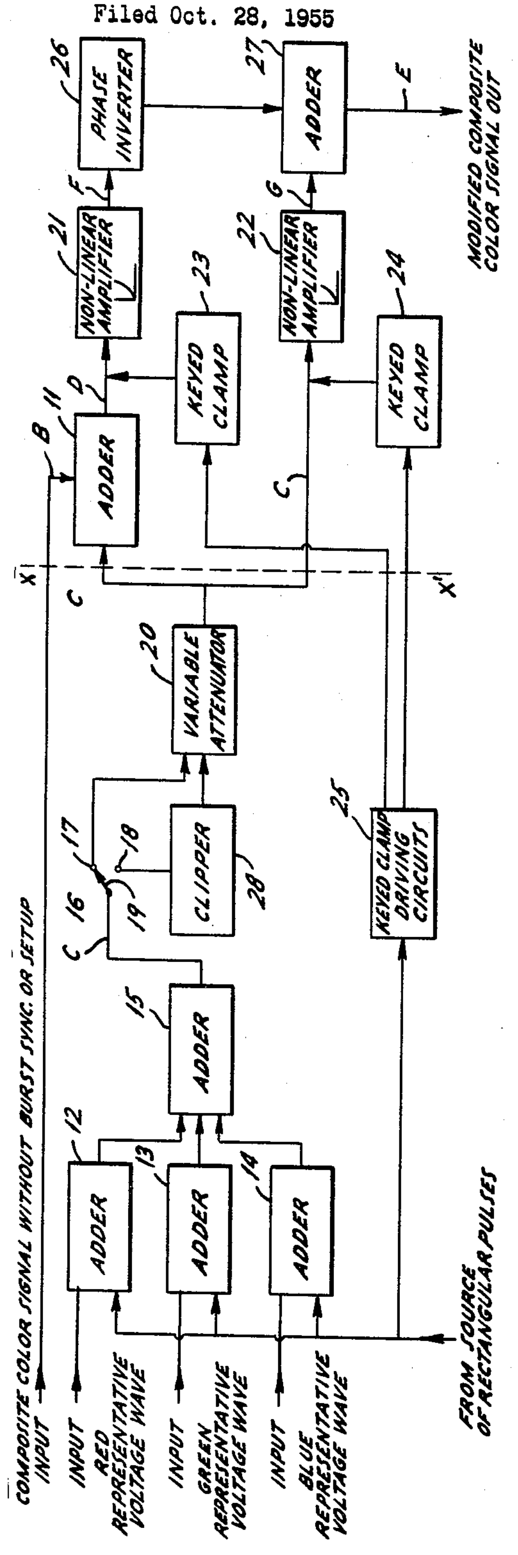
Figure 1 is a block diagram of one form of my invention.

Referring to Figure 1, there is shown a system for modifying the lower amplitude portions of color television signals in accordance with one form of my invention. Input signals to be modified, such as the composite color signal containing neither the color synchronizing "burst" of an oscillatory wave at the sub-carrier frequency, nor the horizontal and vertical synchronizing pulses, nor "set-up" (i.e., the difference between the actual black level and the blanking level) are applied to adder 11. Set-up is an operating tolerance for the transmitter which insures that no black peaks in the signal are clipped off during the process of D.-C. insertion. Set-up is also of value in color television receivers to reduce the visibility of the brust of the sub-carrier frequency signal on the back porch of the horizontal blanking pulse since more of the burst is pushed into the "blacker-than-black" region. The composite color signal may be obtained from the appropriate points in the color encoder sometimes known as a "colorplexer" (see page 204, "Proceedings of the I.R.E." for January 1954).

A modulating signal, which is derived as explained hereinafter, from variable attenuator 20 is added to the input signals in adder 11. The modulating signal is produced by combining in the adder 15 specified amounts of the color representative voltage waves produced by a color television camera, for example. The modulating signal, contains rectangular reference amplitude pulses at the line frequency rate from a source such as the synchronizing pulse generator which is standard equipment at television transmitters which have been added in adders 12, 13 and 14. The maximum amplitude portions of the reference pulses are in the same direction as the maximum amplitude portions of the color representative voltage waves. Either horizontal synchronizing or blanking pulses may conveniently be used for this purpose. These pulses 9 are shown in part C of Figure 2. The combined input modulating and reference signals are applied to a first non-linear amplifier 21. The combined modulating and reference signals from attenuator 20 are applied to a non-linear amplifier 22 whose transfer characteristics preferably are identical to those of amplifier 22. Both amplifiers have a characteristic curve having a slope which is progressively steeper as a function of the amplitude of the signals applied thereto. Keyed clamps 23 and 24 maintain the maximum amplitude of the respective combined signals applied to the amplifiers 21 and 22 at a constant D.-C. level, i.e., at the D.-C. level of the maximum excursion of the reference pulses, in response to signals from the keyed clamp driving circuits 25 which are activated by the same pulses which are supplied to the adders 12, 13 and 14. The modulating signal has been so formed that its instantaneous amplitude is low whenever the lowlight representative components of the input signals are to be increased in amplitude. Hence, they will be amplified over a steeper portion of the curves of amplifier 21 and 22 than the portion thereof over which the highlight representative signals are amplified. The polarity of the output wave of the amplifier 21 is inverted in the phase inverter 26 and added to the output wave of amplifier 22 in the adder 27 thereby cancelling out the modulating signal components and the reference signal components of the waves supplied to the respective amplifiers leaving only the components thereof which correspond to the input signals to be modified.

The operation of the form of the invention shown in Figure 1 is better understood by considering a very simple case. It will be assumed that it is desired to modify the low amplitude portions of only one of the color representative components of the composite color video signal, i.e., the red representative component. It is further assumed that the entire scene to be televised consists of a placard on which a bright red area, a dark red area, and another bright red area are painted next to each other as shown schematically in part A of Figure 2. The composite color signal corresponding to one line scan of this scene appears at point B in Figure 1 and the waveform thereof is shown in part B of Figure 2. As stated above the composite signal corresponding thereto contains neither "burst," nor synchronizing pulses, nor set-up.

It is also assumed that it is desired to improve the quality of the dark red area by increasing the brightness thereof as reproduced in the receiver. In this simple case the modulating signal will consist merely of the luminance component of the input signals. Since the scene being televised consists of varying brightness areas of saturated red, there will be no green or blue representative voltage wave inputs to the adders 13 and 14 respectively. The wave appearing in the output of adder 12 will therefore be (except for the reference pulses 9) the sole constituent of the modulating signal produced in adder 15. Rectangular reference amplitude pulses from the synchronizing pulse generator are applied to the adders 12, 13, and 14 such that their maximum amplitude portions are in the same direction as the maximum amplitude portions of the color representative voltage waves applied thereto. Not specifically shown in Figure 1 are attenuation control elements or circuits which may be included in the adders 12, 13 and 14 so that the amounts of the red, green, and blue voltage waves applied thereto can be individually controlled. The signal at point C of Fig. 1, i.e., the output of adder 15 will appear as shown in part C of Fig. 2, and will include a luminance component 10 which is proportional to the amplitude of the composite color signal shown in part B of Figure 2, and will also include the rectangular pulses 9 which are used in clamping circuits to be described later.

Figures 2, 3:
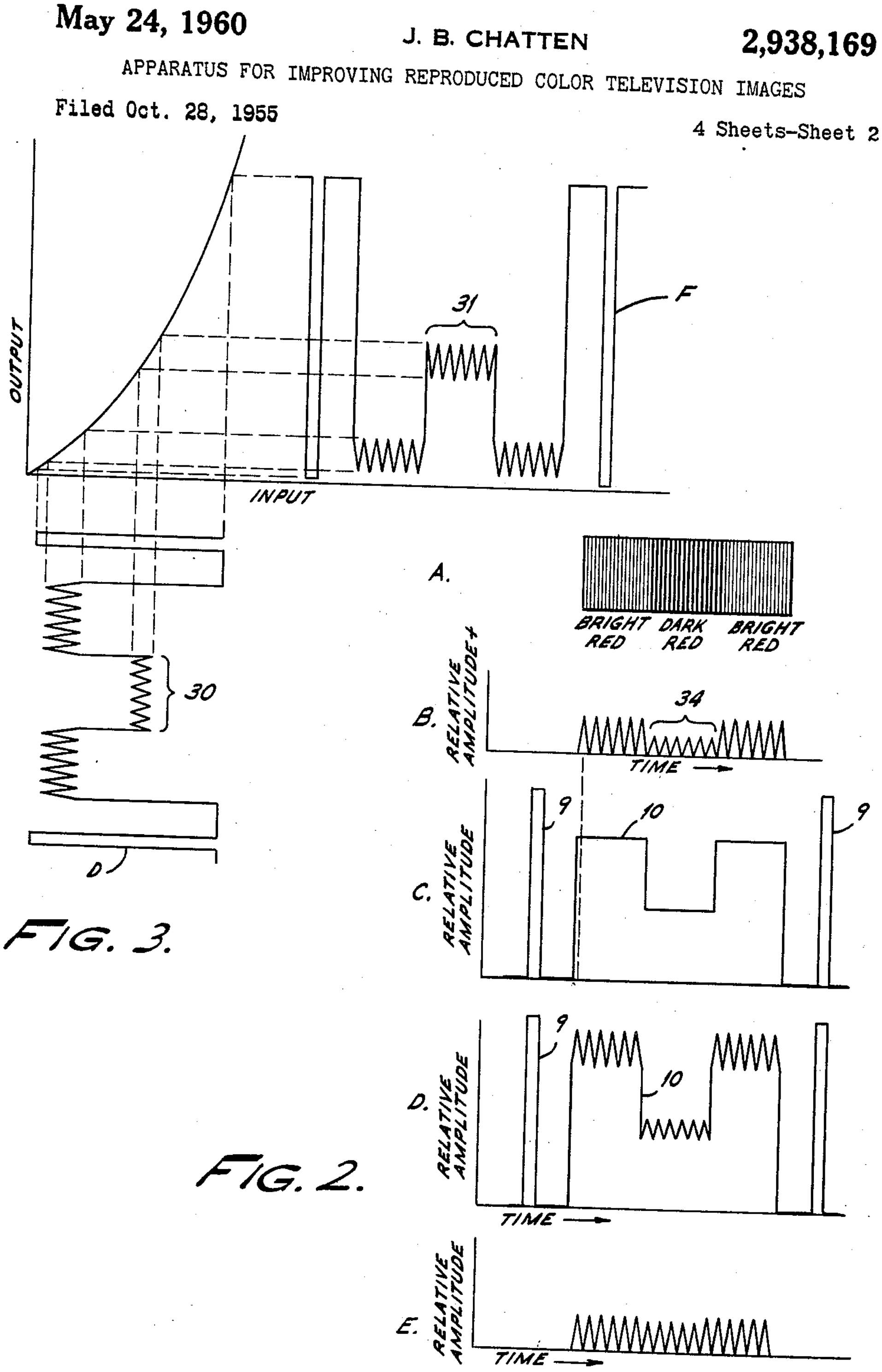
Figure 2 shows the waveforms of signals at various points in the system shown in Figure 1.
Figure 3 illustrates the operation of one of the non-linear amplifiers shown in Figure 1.

The output wave of the variable attenuator 20 will have the same configuration as that of the adder 15 which is illustrated in part C of Figure 2, except for such attenuation or amplification as has been introduced by the attenuator 20 in response to manipulation by an operator thereof. The rectangular pulses 9 appear at the beginning of each line approximately in the time interval during which horizontal synchronizing pulses would appear. The signal having the waveform shown in part C of Figure 2, which appears in the output of the attenuator 20, is applied to adder 11 where it is combined with the input composite color signal (part B of Figure 2) to form a signal whose waveform is illustrated in part D of Figure 2. This output signal is clamped at the maximum value of the rectangular pulses 9 by keyed clamp 23 which operates in response to driving pulses from the keyed clamp driving circuits 25 which in turn are supplied with the rectangular pulses 9 from an appropriate source as explained hereinbefore. The clamped waveform shown in part D is then applied to the input circuit of a non-linear amplifier 21 which may be of conventional design. The clamp 23 helps to position the signal wave applied to the amplifier 21 so that the maximum amplitude value of the rectangular pulses 9 (and hence the maximum values of the modulating signal is amplified at a fixed point on the transfer characteristic curve of the amplifier 21, i.e., at a point where the gain of the amplifier is approximately unity.

The modulating signal 10 containing reference pulses 9 appearing in the output of the variable attenuator 20 is clamped by the keyed clamp 24 which is also coupled to the keyed clamp driving circuits 25. The clamped modulating and reference signals are then so applied to the non-linear amplifier 22, which may be substantially identical in operating characteristics to amplifier 21, that the maximum amplitude excursions of the rectangular pulses 9 fall on the same point of the transfer characteristic curve (the unity gain point) of the amplifier 21 as do their counterparts in the amplifier 22. The keyed clamps 23 and 24 may be of conventional design as shown in "Television Engineering" (Second Edition, McGraw-Hill, 1952) by D. G. Fink, at page 299.

As a result of the non-linear amplification of the signals applied to amplifiers 21 and 22, output signal waves having the form shown in parts F and G respectively of Fig. 2 are produced. On inspection of the waveform F of the signal (shown in Fig. 3) produced by amplifier 21 it will be noted that the portion 31 thereof is approximately doubled in amplitude with respect to the corresponding portion 30 of the input wave D. Portions 30 and 31 correspond to the dark red part of the scene televised as shown in part A of Fig. 2.

Figure 4:
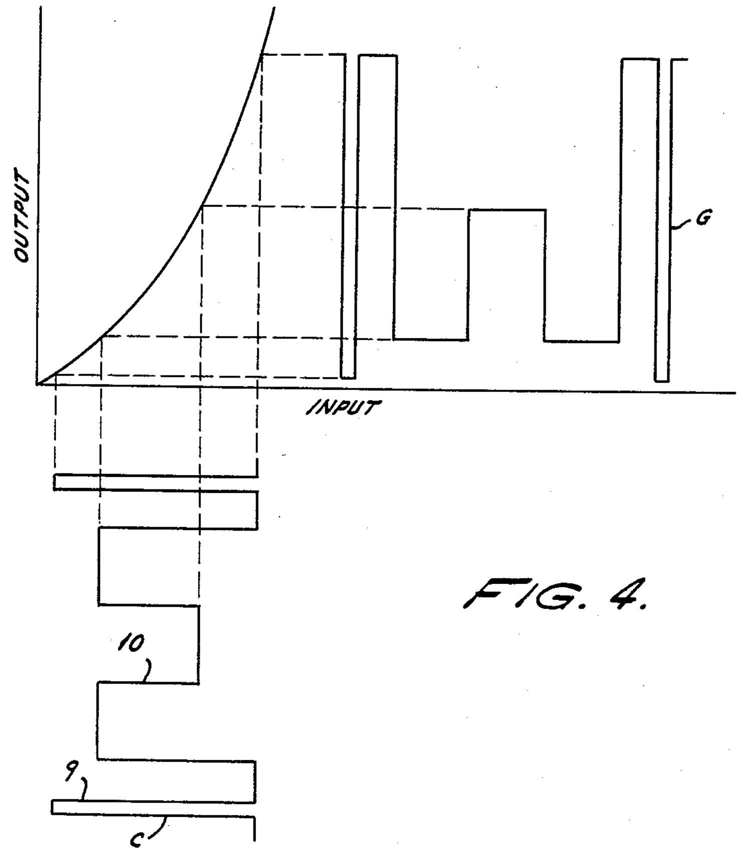
Figure 4 illustrates the operation of the other non-linear amplifier shown in Figure 1.

The output signal wave G of the non-linear amplifier 22 is shown in Fig. 4 and consists of the modulating signal containing rectangular pulses whose lower amplitude values have been amplified disproportionately more than its higher amplitude values. The output signal wave G is applied to an adder 27 to which the waveform F in opposite polarity is applied via the phase inverter 26. In the adder 27 the signals, whose waveforms are F and G of Figs. 3 and 4, are combined algebraically. That is to say, the signal having waveform G is subtracted from the signal having waveform F. As a result, there will appear in the output of the adder 27 a signal whose waveform corresponds to part E of Fig. 2. It is seen that the portion 33 of waveform E has had its amplitude increased with respect to the portion 34 of the input composite color signal whose waveform is shown in part B of Fig. 2. Consequently the luminance of the dark red portion of the televised scene shown in part A, as reproduced, will be greater, thus producing the desired increase in brightness.

The modified composite color signal from the output circuit of the adder 27 may then be applied back to the color encoder so that burst, synchronizing pulses and set-up may be added prior to broadcast or other types of transmission.

By observing the picture resulting from modification of the low intensity components of the composite color video signal as reproduced on a monitor television receiver of the transmitter, the operator of the equipment can determine the appropriate amount by which the luminance of the lowlights in some or all colors is to be increased in the reproduced image. Should greater luminance of the lowlights be desired, the operator adjusts the variable attenuator 20 accordingly so that the amplitude of the portion 33 of the waveform shown in part E of Fig. 2 can be increased without, however, affecting the amplitude of other portions of the wave shown in part E to any great extent, and without affecting the maximum intensity representative levels of any of the signals.

Figure 5:
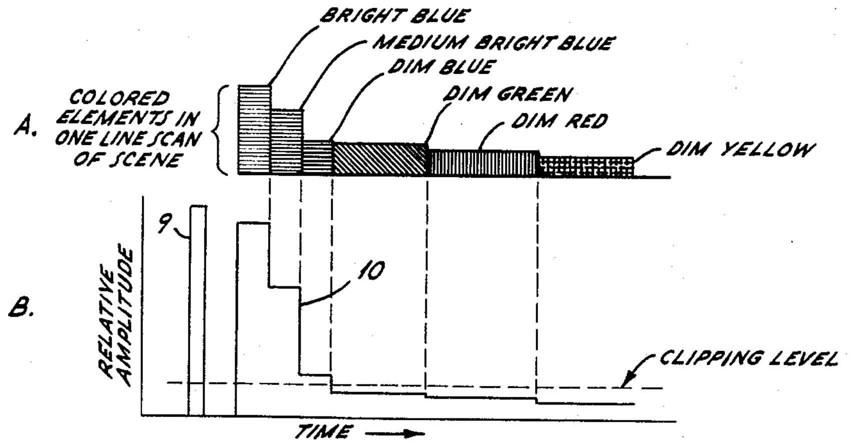
Figure 5 represents schematically a portion of a televised scene and the waveform of a signal generated in the apparatus of Figure 1 in response thereto.

The explanation of the invention so far has been based on an illustrative scene containing only colored areas having the same hue and saturation but having different luminance values. It should be understood, however, that scenes containing different colors may also be modified by apparatus constructed according to my invention. For example, let us assume that it is desired to increase the luminance of red, green, and yellow colored lowlights of a scene which also includes blue highlights as shown schematically in part A of Figure 5. These modifications of the input signals call for amplifying the lowlight representative signals over a steep part of the amplifiers' transfer characteristic curve, and amplifying the highlight and medium brightness representative signals over a less steep part of the curve. Since the modulating signal predominantly determines on which part of the curve the contemporaneous input signals are amplified, the modulating signal is made to have very low amplitude values when the input signals correspond to lowlight reds, greens, and yellows, and very high amplitude when the input signals correspond to highlights and medium brightness elements of the scene. The operator of the apparatus will therefore adjust the respective gains of the adders 12, 13 and 14 so that the modulating signal contains, say, ten amplitude units of blue, one unit of green and one of red. The low amplitude ranges of the signals applied to the non-linear amplifiers are amplified the most, as inspection of the input waveforms C and D, and the corresponding output waveforms G and F of Figures 3 and 4 reveals. If the blue colored elements of the scene televised are relatively bright, it is obvious that the components of the composite color signal corresponding thereto which are not applied to the linear (unity gain) portion of the transfer characteristic curve of the non-linear amplifiers will also be increased in amplitude. Therefore, in order to prevent amplification of the latter components on the non-linear portion of the amplifiers' respective operating characteristic curves, the clipper 28 may be brought into the circuit by moving the arm 19 of switch 16 to connect with contact 18. The clipper 28 extracts only those portions of the modulating signal 10' and the rectangular pulses 9 below the clipping level indicated in part B of Figure 5. Thus, the instantaneous amplitude values of the modulating signal 10' which correspond to the high and medium brightness blue parts of the line scanned are clipped so that their maximum amplitude is now the same as that of the clipped rectangular pulses 9. The amplitude values of the modulating signal 10' corresponding to the dimmest blue parts of the line scanned, and the values corresponding to the dim green, red and yellow parts all fall well below the clipping level. The clipped modulating signal 10' with the pulses 9 is then applied to attenuator 20 where its peak-to-peak amplitude may be increased or decreased as desired. The output signal wave of the attenuator 20 is then applied both to the adder 11 and to the input circuit of the non-linear amplifier 22. In the input circuit of amplifier 22, the keyed clamp 24 operates to position the top of the clipped clamping pulse 9 so that it falls on the portion of the non-linear characteristic curve of the amplifier 22 where the latter has unity gain. Consequently the composite color signal which rides on the peak of the clipped modulating signal during the time that the bright and medium bright blue components are scanned will not have their amplitude increased whereas the low brightness greens, reds and yellows will be amplified considerably. Those portions of the input signals corresponding to the low brightness blues which lie below the clipping level will also be amplified about as much as the dim greens, reds and yellows, but those portions which lie above the clipping level will be amplified in the unity gain part. Thus the clipping operation enables the system to be used even more selectively. As a result, the modified composite color signal appearing in the output of adder 27 will produce, when applied to an appropriate display device, blue areas whose brightness is for the most part not modified, and low brightness greens, reds and yellows which have had their respective intensities increased.

While it is true that the peak-to-peak amplitude of the composite color signal which rides on the modulating signal is very small with respect to the contemporaneous value of amplitude of the latter, and therefore the composite color signal component swings over only a very small part of the transfer characteristic curve of the amplifier 22, a certain amount of distortion may arise as a result of the fact that the negative half cycles of the composite signal applied thereto, for example, may fall on a steeper portion of the curve than do the positive half cycles and, are amplified slightly more than the positive half cycles thereof. In order to reduce this possible distortion, which is largely a second-order effect, the alternative system shown in Figure 6 may be used. The apparatus to the right of dashed line XX' in Figure 6 supplants the apparatus to the right of line XX' in Figure 1. The input composite color signal is first applied to a phase splitter 10 whose oppositely polarized output signal waves at points B and K are shown respectively in part B, Figure 2 and part A, Figure 7. These waves are respectively combined in adders 11 and 11' with the modulating signal appearing in the output circuit of the variable attenuator 20 producing signal waves at points D and L as shown in part D, Figure 2 and part B, Figure 7. The latter waves are then applied to respective non linear amplifiers 21 and 22. The application of the latter waves to the amplifiers 22 and 21 is somewhat analogous to the operation of a push-pull amplifier and produces a similar diminution of distortion since the output waves of the amplifiers are combined with one another in adder 27. The output wave of the adder 27 at point M (part C, Figure 7) in this form of the invention is somewhat different from that shown in part E of Figure 2 since the amplitude of the modified composite color signal is doubled in amplitude. This occurs because of the splitting of the phase of the composite color signal, before it is combined with each of the respective modulating signal waves, and the subsequent inversion in phase of one of the output waves of the non-linear amplifiers in the phase inverter 26. The amplitude of the modified composite color signal in this alternative form of the invention may of course be controlled by appropriate attenuators which can be coupled to, or included in, the adder 27.

Figure 8:
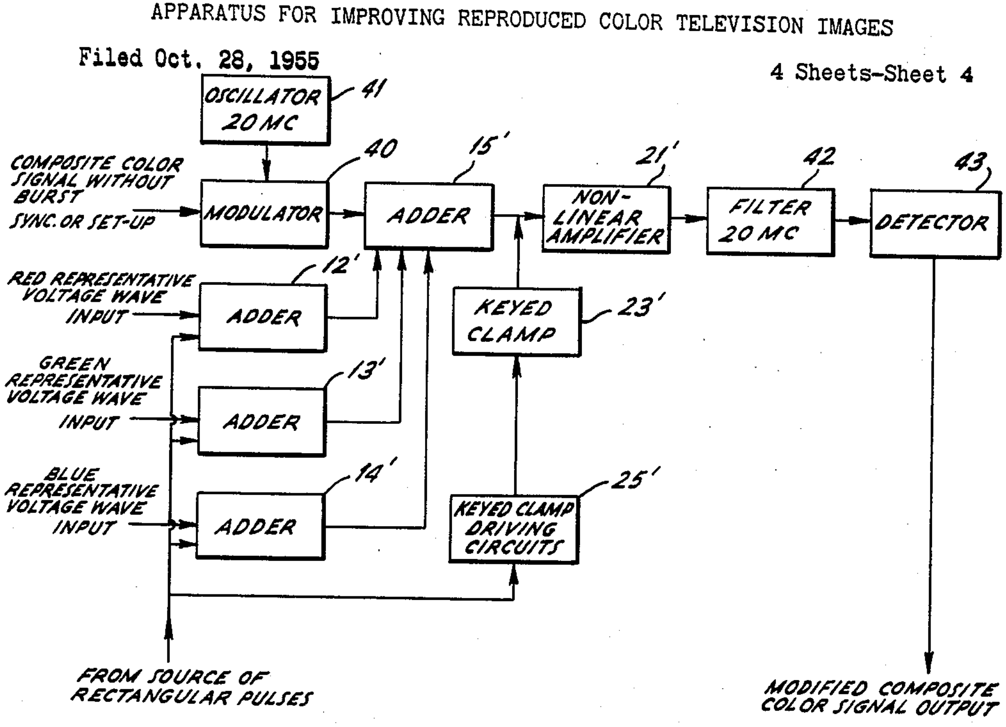
Figure 8 is a block diagram of the invention in still another form.

Another form of the invention is shown in Figure 8. The composite color signal without burst, synchronizing pulses or set-up is applied to a modulator 40 to which the signals produced by oscillator 41 are also applied. The oscillator 41 operates to produce an oscillatory wave having a frequency outside the frequency range of the video signals in the composite color signal. A frequency of 20 megacycles, for example, would be suitable for this purpose. The modulated oscillatory wave appearing in the output of modulator 40 is applied to an adder 15' which may be identical to adder 15 shown in Figure 1.

A modulating signal is derived by applying selected amounts of the color representative voltage waves, in the same manner as described previously, to the adders 12', 13' and 14' which may be identical to their counterparts shown in Figure 1. The amounts of the color representative waves thus applied are determined by the same considerations discussed in connection with the preceding figures. To other inputs of the adders 12′, 13′ and 14′ respectively, signals from an appropriate source of rectangular pulses are applied which have their maximum values in the same direction as the maximum values of the color representative voltage waves. The output waves of the adders are applied to adder 15′ in which the modulating signal is added to the modulated oscillator wave from the modulator 40. The combined wave is then applied to non-linear amplifier 22′ which may operate substantially as does the amplifier 22 shown in Fig. 1. The rectangular pulses are also fed to keyed clamp driving circuits 25′ which drive the keyed clamp 23′ so that the maximum amplitude values of the signals applied to the non-linear amplifier 22′ are maintained at the desired point on the transfer characteristic curve at which the non-linear amplifier 22′ operates. The output wave of the amplifier 22′ is applied to a filter 42 whose passband is centered at a frequency of 20 megacycles with a 12 megacycle bandwidth to permit the passage of the desired components of the signals applied to it. The filter 42 permits the passage only of the amplified input signal components which appear as modulations of the 20 mc. carrier. These modulations are detected from their 20 megacycle carrier by conventional amplitude detector 43 whose output wave consists of the composite color signals modified in the desired fashion.

Figure 6:
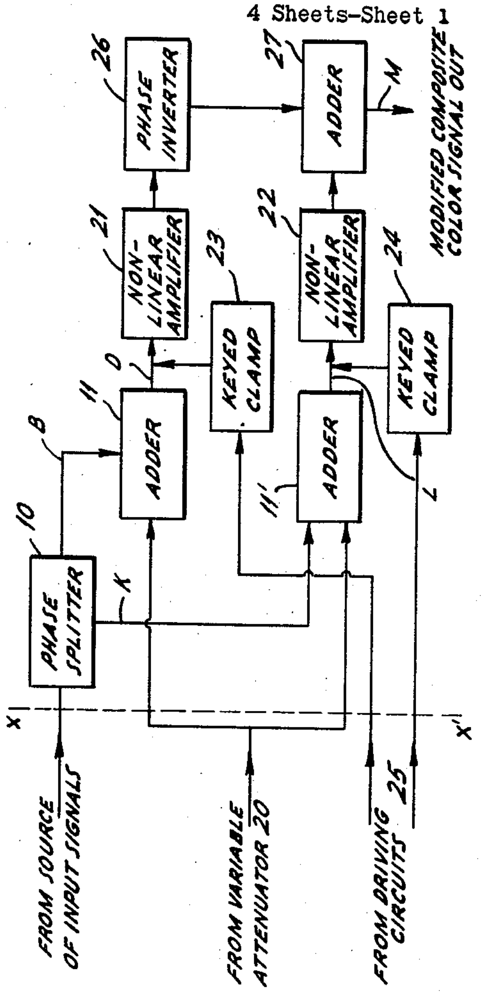
Figure 6 is a block diagram illustrating another form of the invention.
Figure 7:
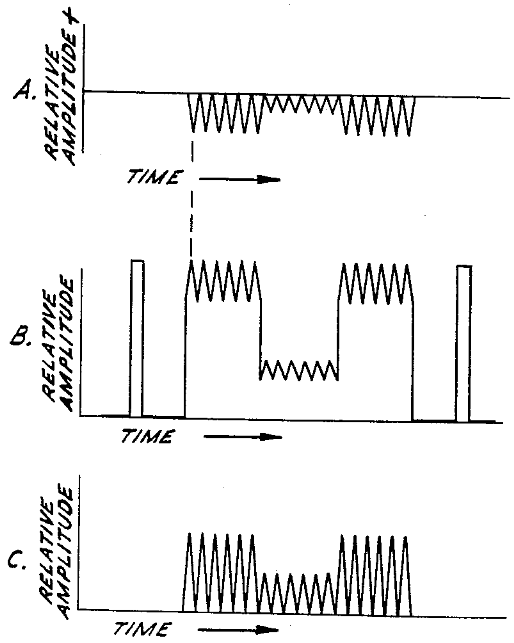
Figure 7 shows the waveforms of signals produced in the apparatus shown in Figure 6.

The keyed clamps of Figures 1, 6, and 8 are an important part of the invention because they permit the establishment of the maximum amplitude level in the direction of signals having values corresponding to increasing luminance so that low amplitude levels are amplified at gains which are greater than those for other amplitude levels. In Figures 1 and 6 the clamps permit the application of the signals applied to the non-linear amplifiers 21 and 22 to fall on respectively similar parts of the transfer characteristic curves thereof, thus facilitating the cancellation of the modulating signal in circuits after the amplifiers 21 and 22. By clamping at the maximum intensity level, the amplitude of the lesser intensity signal may be easily modified by manipulation of the attenuator 20 without affecting the amplification of the maximum intensity portions of the signal which are amplified at or near the unity gain portions of the transfer characteristic curves of the amplifiers 21 and 22.

When the amplitude of the input composite color signals is zero, the modulating signal is cancelled in the adder 27 and there is no output signal so that the black representative portions of the composite signal are reproduced as black areas in the image on the display tube. This is in contrast to some other systems for lowlight modification which have been mentioned above in which the average amplitude of the composite color signal is increased by adding a uniform extra component of D.-C. which makes the black components of the reproduced image less black and changes the saturation of all colors somewhat.

Although the reference rectangular pulses have been combined with the color representative voltage waves in adders 12, 13 and 14 in Figure 1, it is obvious that they can be added elsewhere in the circuit, as for example in the adder 15. This is also true in Figure 6 where they may be added into the color representative voltage waves in the adder 15′.

It will be understood that still other embodiments and applications of apparatus according to my invention will occur to those skilled in the art. Consequently, I desire the scope of this invention to be limited only by the appended claims.

What I claim is:

1. In a system for modifying signals: means for combining input signals to be modified with a modulating signal, said modulating signal having frequency components within the same band as the frequency components of said input signals, means for amplifying selected amplitude portions of said combined signals differently than other amplitude portions thereof, and means for eliminating the modulating signal components from said amplified signals.

2. A system for modifying signals which have frequency components within a given band comprising: means for combining input signals to be modified with a modulating signal which has frequency components within said given band, means for amplifying the relatively low amplitude portions of said combined signal differently than the other amplitude portions thereof, and means for extracting the components corresponding to said input signals from said amplified signals.

3. In a signal modification system: means for combining input signals to be modified with a modulating signal which has frequency components in the same range as the frequency components of said input signals, means for amplifying the relatively low amplitude portions of said combined signals more than the other amplitude portions thereof, and means for extracting the components corresponding to said input signals from said amplified signals.

4. In a signal modification system: means for combining input signals to be modified with a modulating signal which has frequency components in the same range as the frequency components of said input signals and with reference amplitude signals, means for amplifying selected amplitude portions of said combined signals more than the other amplitude portions thereof, and means for extracting the components corresponding to said input signals from said amplified signals.

5. The system according to claim 4 wherein said amplifying means is constructed and arranged to amplify the relatively low amplitude portions of said combined signals more than the higher amplitude portions thereof.

6. The system according to claim 5 and also including means for establishing the maximum amplitude excursions of said combined signals at the level of the maximum values of the reference signals therein before said combined signals are amplified.

7. A signal modification system comprising: means for combining input signals to be modified which include a plurality of independently varying components with a modulating signal composed of selected amounts of said components, means for amplifying selected amplitude portions of said combined signals differently than other amplitude portions thereof, and means for extracting the components corresponding to said input signals from said amplified signals.

8. A signal modification system comprising: means for combining input signals to be modified which include an independently varying component with a modulating signal and with reference amplitude signals, said modulating signal being composed of a selected amount of said independently varying component, said reference signals having uniform maximum amplitude portions in the same polarity as the maximum amplitude portions of said independently varying component, means for amplifying selected amplitude portions of said combined signals differently than other amplitude portions thereof, and means for extracting the components corresponding to said input signals from said amplified signals.

9. A signal modification system comprising: means for combining input signals to be modified which include a plurality of independently varying components with a modulating signal and with reference amplitude signals, said modulating signal being composed of selected amounts of said components, said reference signals having uniform maximum amplitude portions in the same polarity as the maximum amplitude portions of said components, means responsive to said reference signals for amplifying selected amplitude portions of said combined signals differently than other amplitude portions thereof, and means for extracting the components corresponding to said input signals from said amplified signals.

10. A signal modification system comprising: means for combining input signals to be modified with reference amplitude signals and with a unidirectional modulating signal, said modulating signal having frequency components in the same band as those of said input signals, said reference signals having uniform maximum amplitude portions in the same direction as the maximum amplitude portions of said modulating signal, means responsive to said reference signals for amplifying the relatively low amplitude portions of said combined signals more than the other amplitude portions thereof, and means for extracting the components corresponding to said input signals from said amplified signals.

11. A signal modification system comprising: means for combining input signals to be modified with a modulating signal, first non-linear amplifying means for amplifying said combined signals, second non-linear amplifying means for amplifying said modulating signal, and means coupled to both of said amplifying means for extracting from said amplified signals the components which correspond to said input signals.

12. A signal modification system comprising: a source of input signals to be modified, first combining means for combining said input signals with reference amplitude signals and with a unidirectional modulating signal, said modulating signal having frequency components in the same band as those of said input signals, said reference signals having uniform maximum amplitude values in the same direction as the maximum amplitude values of said modulating signal, first amplifying means for amplifying the relatively low amplitude portions of said combined input, reference, and modulating signals more than other amplitude portions thereof, second combining means for combining said modulating signal with said reference signals, second amplifying means for amplifying the relatively low amplitude portions of said combined reference and modulating signals more than other portions thereof, said first and second amplifying means having substantially identical transfer characteristics, and means for extracting the components corresponding to said input signals from said amplified signals.

13. The system according to claim 12 wherein said extracting means includes means for inverting the polarity of the output signal wave of one of said amplifying means and further includes means for combining said inverted polarity signal wave with the output signal wave of the other of said amplifying means.

14. A signal modification system comprising: a source of input signals to be modified which include a plurality of components having independently varying amplitude, means for producing a modulating signal composed of selected amounts of said independently varying components, means for adding reference amplitude signals to said modulating signal, said reference signals having their uniform maximum amplitude portions in the same direction as the maximum amplitude portions of said independently varying components, means for adding said input signals to said combined modulating and reference signals, first clamping means for establishing a reference voltage level for said combined input, reference, and modulating signals at the maximum value of said reference signals, second clamping means for establishing a reference voltage level for said combined modulating and reference signals at the maximum value of said reference signals, first and second non-linear amplifying means coupled to said first and second clamping means respectively, said first and second amplifying means having substantially the same transfer characteristics and being constructed to produce output waves in response to the respective waves applied thereto, means for inverting the phase of one of said output waves, and means for combining said inverted output wave with said other output wave whereby the components of said output waves corresponding to said input signals are extracted.

15. A signal modification system comprisign: a source of input signals to be modified which include a plurality of components having independently varying amplitude, means for producing a modulating signal composed of selected amounts of said independently varying components, means for combining reference amplitude signals with said modulating signal, said reference signals having uniform maximum amplitude portions in the same direction as the maximum portions of said independently varying components, means for clipping said combined reference and modulating signals at a predetermined level, means for combining said input signals with said clipped reference and modulating signals, first means for establishing a reference voltage level for said combined input, reference and modulating signals at the maximum value of said reference signals, second means for establishing a reference voltage level for said combined modulating and reference signals at the maximum value of said reference signals, first and second means for amplifying said respective combined signals, said first and second amplifying means having substantially the same nonlinear transfer characteristics and being constructed to produce output waves in response to the respective combined signals applied thereto, means for inverting the phase of one of said output waves, and means for combining said inverted output wave with said other output wave whereby the components of said output waves corresponding to said input signals are extracted.

16. A signal modification system comprising: a source of input signals to be modified which include a plurality of components having independently varying amplitude, a source of a unidirectional modulating signal composed of selected amounts of said independently varying components having frequency components in the same band as said input signals, a source of reference signals having uniform maximum amplitude values in the same direction as the maximum amplitude values of said independently varying components, means for combining said input signals with said reference amplitude signals and with said modulating signal, means coupled to said source of input signals for inverting the polarity of said input signals, means for combining said inverted input signals with said reference amplitude signals and with said modulating signal, first and second amplifying means for amplifying the relatively low amplitude portions of said respective combined signals more than the other amplitude portions thereof, said first and second amplifying means having substantially identical transfer characteristics, and means for extracting the components corresponding to said input signals from said amplified signals.

17. In a system for modifying signals: means for modulating an oscillatory wave by input signals to be modified, said oscillatory wave having a frequency outside the range of the frequency components of said input signals, means for combining said modulated oscillatory wave with a modulating signal which has frequency components in the same range as the frequency components of said input signals, means for amplifying the relatively low amplitude portions of said combined signals differently than the higher amplitude portions thereof, and means for extracting the components corresponding to said input signals from said amplified signals.

18. A signal modification system comprising: a source of input signals to be modified which include a plurality of components having independently varying amplitude, a source of an oscillatory wave having a frequency remote from the frequency components of said plurality of components, means for modulating said oscillatory wave by said input signals, means for producing a modulating signal composed of selected amounts of said independently varying components, means for combining said modulated oscillatory wave with said modulating signal and with reference amplitude signals, said reference signals having uniform maximum amplitude portions of the same polarity as the maximum amplitude portions of said independently varying components, means for amplifying the relatively low amplitude portions of said combined signals differently than the higher amplitude portions thereof, and means for extracting the input signal components from said amplified signals.

19. A signal modification system comprising a source of composite color television signals which include a plurality of components which are representative of the colors of a televised scene and which have independently varying amplitude, a source of an oscillatory wave having a frequency remote from the frequencies of said input signals, means for modulating said oscillatory wave by said composite color television signals, a source of rectangular pulses having a repetition rate which is the same as the line frequency, means to which said color representative components are applied for producing a modulating signal composed of selected amounts of said independently varying components, means for adding said modulating signal, said rectangular pulses and said modulated oscillatory wave, to form a single combined wave, means coupled to said last-named adding means for establishing the maximum excursion of said single combined wave at the maximum amplitude value of said rectangular pulses, non-linear amplifying means, means for applying said last-named combined wave to said non-linear amplifying means so that the relatively low amplitude portions of said applied wave are amplified more than the other amplitude values thereof, frequency selective means coupled to the output circuit of said amplifying means for extracting the modulated oscillatory wave component of the wave applied to said amplifying means, and means coupled to said frequency selective means for detecting the modulations of said oscillatory wave component.

20. In a system for modifying signals: means for combining input signals to be modified with a modulating signal, said modulating signal having frequency components within the same band as the frequency components of said input signals, said modulating signal further having a substantially larger amplitude than the average amplitude of said input signals, means for amplifying selected amplitude portions of said combined signals differently than other amplitude portions thereof, and means for eliminating the modulating signal components from said amplified signals.

References Cited in the file of this patent

UNITED STATES PATENTS

| | | |
|---|---|---|
| 2,346,020 | Gillespie | Apr. 4, 1944 |
| 2,421,727 | Thompson | June 3, 1947 |
| 2,524,165 | Freedman et al. | Oct. 3, 1950 |
| 2,566,707 | Sziklai | Sept. 4, 1951 |
| 2,647,209 | Krause | July 28, 1953 |
| 2,686,831 | Dome | Aug. 17, 1954 |
| 2,692,333 | Holmes | Oct. 19, 1954 |
| 2,708,717 | Holmes | May 17, 1955 |